(12) United States Patent
Shimizu et al.

(10) Patent No.: US 10,120,323 B2
(45) Date of Patent: Nov. 6, 2018

(54) IMAGE FORMING APPARATUS

(71) Applicant: CANON KABUSHIKI KAISHA, Tokyo (JP)

(72) Inventors: Yusuke Shimizu, Yokohama (JP); Kenichi Iida, Tokyo (JP); Takao Kume, Yokohama (JP); Keisuke Ishizumi, Hiratsuka (JP); Toshihiko Takayama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/660,794

(22) Filed: Jul. 26, 2017

(65) Prior Publication Data

US 2018/0032023 A1    Feb. 1, 2018

(30) Foreign Application Priority Data

Jul. 29, 2016 (JP) ................. 2016-150419

(51) Int. Cl.
   *G03G 15/16* (2006.01)
   *G03G 15/00* (2006.01)
   *H04N 1/00* (2006.01)

(52) U.S. Cl.
   CPC ......... *G03G 15/80* (2013.01); *G03G 15/5004* (2013.01); *G03G 15/5008* (2013.01); *H04N 1/00254* (2013.01); *G03G 15/161* (2013.01); *G03G 15/5054* (2013.01); *G03G 2215/0103* (2013.01)

(58) Field of Classification Search
   CPC ............................ G03G 15/80; G03G 15/5004
   See application file for complete search history.

(56) References Cited

U.S. PATENT DOCUMENTS 4,466,732 A * 8/1984 Folkins .............. G03G 15/0907
                                                 399/252
5,200,789 A * 4/1993 Oshiumi ................ G03G 21/00
                                                 399/150

(Continued)

FOREIGN PATENT DOCUMENTS

JP            62043681 A  *  2/1987
JP            04171463 A  *  6/1992

(Continued)

*Primary Examiner* — Sevan A Aydin
(74) *Attorney, Agent, or Firm* — Canon U.S.A., Inc. IP Division

(57) ABSTRACT

The present disclosure is directed to suppressing image defects due to variations in the values of currents flowing through respective photosensitive drums during image formation, and reducing the absolute value of a voltage applied when a primary transfer power supply unit applies a voltage of polarity opposite to that during image formation, to primary transfer members. There is provided an image forming apparatus including a transfer member configured to make contact with an inner peripheral surface of a transfer belt, a first power supply unit configured to apply a voltage to the transfer member, a resistance element connected between the first power supply unit and the transfer member, and a diode connected in parallel with the resistance element in a direction in which a current flowing in a first direction is blocked and a current flowing in a second direction is passed.

21 Claims, 10 Drawing Sheets

(56) References Cited

U.S. PATENT DOCUMENTS

| | | | | |
|---|---|---|---|---|
| 5,253,024 A | * | 10/1993 | Okuda | G03G 15/2064 219/216 |
| 5,416,565 A | * | 5/1995 | Noda | G03G 13/22 399/176 |
| 2005/0214020 A1 | * | 9/2005 | Walgrove, III | G03G 21/0035 399/101 |
| 2013/0259543 A1 | * | 10/2013 | Katagiri | G03G 15/5004 399/302 |

FOREIGN PATENT DOCUMENTS

| | | |
|---|---|---|
| JP | 2006-337816 A | 12/2006 |
| JP | 2015-099380 A | 5/2015 |
| WO | 02-056119 A1 | 7/2002 |

\* cited by examiner

FIG.4

| VOLTAGE (V) OF PRIMARY TRANSFER POWER SUPPLY UNIT 50 | ABSOLUTE VALUE OF CURRENT (µA) FLOWING THROUGH PRIMARY TRANSFER PORTION | |
|---|---|---|
| | PRESENT EXEMPLARY EMBODIMENT | COMPARATIVE EXAMPLE 1 |
| -1000 | 5.1 | 4.1 |
| -1200 | 6.2 | 4.8 |
| -1400 | 7.1 | 5.6 |
| -1600 | 8.0 | 6.5 |
| -1800 | 9.1 | 7.2 |
| -2000 | 10.0 | 8.0 |
| -2200 | 11.1 | 8.8 |
| -2400 | 12.0 | 9.6 |
| -2600 | 13.3 | 10.5 |
| -2800 | 14.0 | 11.2 |
| -3000 | 15.1 | 12.2 |

⊖ : ANION
⊕ : CATION

FIG.10

| VOLTAGE (V) OF POWER SUPPLY UNIT 290 | ABSOLUTE VALUE OF CURRENT (µA) FLOWING THROUGH PRIMARY TRANSFER PORTION | |
|---|---|---|
| | PRESENT EXEMPLARY EMBODIMENT | COMPARATIVE EXAMPLE 2 |
| -1000 | 3.4 | 3.0 |
| -1200 | 4.0 | 3.6 |
| -1400 | 4.7 | 4.1 |
| -1600 | 5.4 | 4.6 |
| -1800 | 6.0 | 5.2 |
| -2000 | 6.7 | 5.7 |
| -2200 | 7.3 | 6.4 |
| -2400 | 8.0 | 6.9 |
| -2600 | 8.8 | 7.7 |
| -2800 | 9.3 | 8.0 |
| -3000 | 10.2 | 8.7 |

IMAGE FORMING APPARATUS

BACKGROUND

Field of the Disclosure

The present disclosure relates to an electrophotographic image forming apparatus such as a copying machine and a printer.

Description of the Related Art

There has heretofore been known an electrophotographic color image forming apparatus which is configured to include yellow (Y), magenta (M), cyan (C), and black (K) color image forming units independently arranged around a transfer belt serving as an intermediate transfer member or transfer material conveyance member. The color image forming units include respective drum-shaped photosensitive members (hereinafter, referred to as photosensitive drums) serving as image bearing members. Primary transfer members are provided in positions opposite to the respective photosensitive drums via the transfer belt. With such a configuration, the photosensitive drums make contact with the transfer belt in respective primary transfer portions. In the primary transfer portions, primary transfer power supply units apply a voltage to the primary transfer members, whereby toner images formed on the respective photosensitive drums are transferred to the transfer belt or a transfer material.

In such an image forming apparatus, toner adhering to the transfer belt in the process of transfer (hereinafter, referred to as residual toner) may be reversely transferred to and collected by the photosensitive drums in the primary transfer portions to clean the transfer belt. Hereinafter, reversely transferring toner from the transfer belt to the photosensitive drums will be referred to as reverse transfer. The reverse transfer and collection of the residual toner to/by the photosensitive drums can be performed by the primary transfer power supply units applying a voltage of polarity opposite to that applied during primary transfer, to the primary transfer members when the residual toner passes through the primary transfer portions.

Image forming apparatuses have become smaller in size and lower in cost in recent years. Japanese Patent Application Laid-Open No. 2015-99380 discusses a configuration in which a plurality of primary transfer members is connected with a common primary transfer power supply unit. The primary transfer power supply unit discussed in Japanese Patent Application Laid-Open No. 2015-99380 is configured so that a high voltage supply source of positive polarity used for image formation is superposed on a high voltage supply source of negative polarity for use in cleaning an intermediate transfer belt.

In the configuration discussed in Japanese Patent Application Laid-Open No. 2015-99380, the common primary transfer power supply unit applies equal voltages to all the primary transfer members. However, the primary transfer members actually vary in electrical resistance. Currents flowing through the photosensitive drums of the respective color image forming units can thus vary in value. If variations in the values of the currents flowing through the photosensitive drums are large, an image defect may occur. A resistance element having a resistance value sufficiently greater than variations in the electrical resistances of the primary transfer members is then sometimes connected between the primary transfer members and the primary transfer power supply unit as a measure for suppressing variations in the values of the currents flowing through the photosensitive drums. Such a configuration can reduce variations of the currents flowing through the photosensitive drums in the respective image forming units to suppress the occurrence of image defects.

While the provision of the resistance element can suppress variations in the values of the currents flowing through the photosensitive drums, the following problem occurs if the primary transfer power supply unit applies a voltage of polarity opposite to that during image formation to the primary transfer members for the purpose of cleaning the transfer belt. During cleaning of the transfer belt, toner can be reversely transferred if a current higher than or equal to a predetermined value can be passed through the photosensitive drums. In applying the voltage of polarity opposite to that during image formation, variations of the currents flowing through the respective primary transfer portions do not need to be taken into consideration. A voltage having a lower output value can desirably be used to reversely transfer toner from the intermediate transfer belt to the photosensitive drums. With the configuration including the resistance element, however, the primary transfer power supply unit has needed to apply a voltage having a high output value to the primary transfer members in consideration of a voltage drop due to a current flowing through the resistance element.

SUMMARY

The present disclosure is directed to suppressing image defects due to variations in the values of the currents flowing through the photosensitive drums during image formation, and reducing the absolute value of the voltage applied when the primary transfer power supply unit applies the voltage of polarity opposite to that during image formation, to the primary transfer members.

According to an aspect of the present disclosure, an image forming apparatus includes an image bearing member configured to bear a toner image, a transfer belt configured to rotate in contact with the image bearing member, a transfer member configured to make contact with an inner peripheral surface of the transfer belt, wherein the transfer member is provided to correspond to the image bearing member, a first power supply unit configured to apply a voltage to the transfer member, wherein if the first power supply unit applies a voltage of a second polarity opposite to a first polarity to the transfer member, a current flows in a first direction through a position in which the image bearing member makes contact with the transfer belt, and if the first power supply unit applies a voltage of the first polarity to the transfer member, a current flows in a second direction opposite to the first direction through the position in which the image bearing member makes contact with the transfer belt, a resistance element connected between the first power supply unit and the transfer member, and a diode connected in parallel with the resistance element in a direction in which the current flowing in the first direction is blocked and the current flowing in the second direction can be passed.

Further features of the present disclosure will become apparent from the following description of exemplary embodiments with reference to the attached drawings.

BRIEF DESCRIPTION OF THE DRAWINGS

FIG. 4 is a table for describing the values of currents flowing through primary transfer portions when a voltage of negative polarity is applied from a primary transfer power supply unit according to one or more aspects of the present disclosure.

FIG. 10 is a table for describing the values of currents flowing through primary transfer portions when a voltage of negative polarity is applied from a power supply unit according to one or more aspects of the present disclosure.

DESCRIPTION OF THE EMBODIMENTS

Exemplary embodiments of the present disclosure will be described in detail below with reference to the drawings. Sizes, materials, shapes, and relative arrangements of components described in the following exemplary embodiments are subject to appropriate changes according to configurations and various conditions of apparatuses to which the exemplary embodiments of the present disclosure are applied. The following description is therefore not intended to limit the scope of the present disclosure unless otherwise specified.

[Configuration of Image Forming Apparatus]

Figure 1:
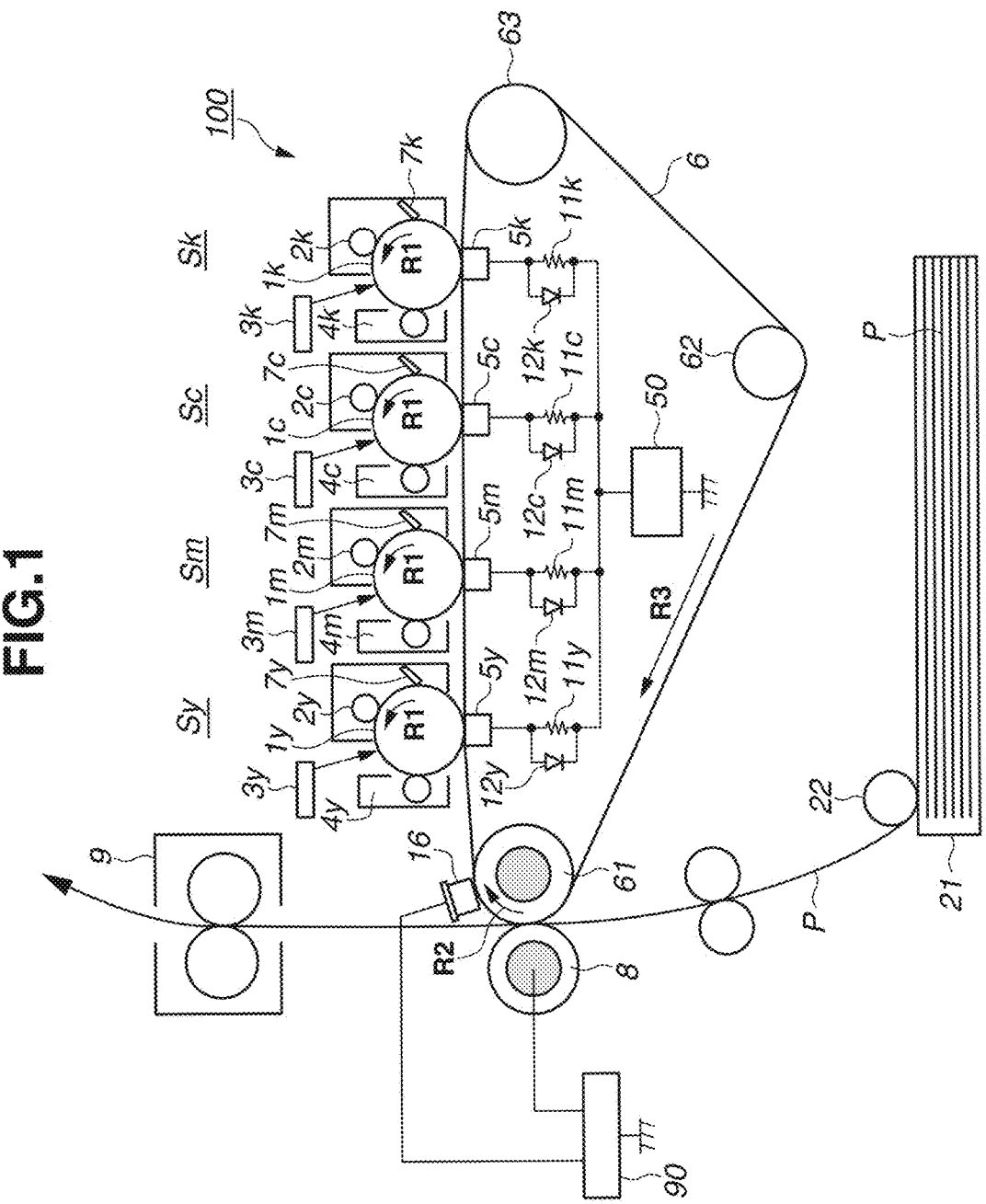
FIG. 1 is a schematic sectional view for describing an image forming apparatus according to one or more aspects of the present disclosure.

FIG. 1 is a schematic sectional view for describing an image forming apparatus 100 according to a first exemplary embodiment. The image forming apparatus 100 according to the present exemplary embodiment is a color image forming apparatus of tandem type which includes first, second, third, and fourth image forming units Sy, Sm, Sc, and Sk as a plurality of image forming units. The plurality of image forming units Sy, Sm, Sc, and Sk arranged in a moving direction of an intermediate transfer belt 6 forms an image by using Y, M, C, and K color toner, respectively. The four image forming units Sy, Sm, Sc, and Sk are arranged in a row at constant distances, and have many configurations and operations substantially in common, except for the colors of the toner contained therein. In the following description, the suffixes y, m, c, and k attached to the reference numerals to indicate which colors the elements are provided for will therefore be omitted unless particular distinction is needed.

As illustrated in FIG. 1, the image forming units S each include a photosensitive drum 1 which is a drum-shaped electrophotographic photosensitive member serving as an image bearing member. A charging roller 2 serving as a charging unit, an exposure unit 3, a developing unit 4, and a cleaning unit 7 are further arranged around the photosensitive drum 1. A primary transfer brush 5 serving as a primary transfer member is arranged in a position opposite to the photosensitive drum 1 with the intermediate transfer belt 6 therebetween. The primary transfer brushes 5y, 5m, 5c, and 5k are provided to correspond to the photosensitive drums 1y, 1m, 1c, and 1k, respectively.

The photosensitive drum 1 is driven by a driving unit (not illustrated) to rotate in the direction of the arrow R1 in the diagram (counterclockwise) at a predetermined circumferential speed. In the process of rotation, the photosensitive drum 1 is uniformly charged to a predetermined potential of predetermined polarity (in the present exemplary embodiment, negative polarity) by the charging roller 2. The exposure unit 3 performs exposure on a position in which a toner image is formed, on the photosensitive drum 1, according to an image signal from an information apparatus (not illustrated) such as a computer. In such a manner, an electrostatic latent image according to an intended image component is formed on the photosensitive drum 1 of each image forming unit S. The electrostatic latent image is then developed by the developing unit 4 in a development position and visualized as a toner image on the photosensitive drum 1.

The normal charging polarity of the toner accommodated in the developing unit 4 is a negative polarity (first polarity). In the present exemplary embodiment, the electrostatic latent image is reversely developed by using the toner charged to the same polarity as the charging polarity of the photosensitive drum 1 by the charging roller 2. However, the present disclosure is not limited thereto. An exemplary embodiment of the present disclosure may be applied to an image forming apparatus that positively develops an electrostatic latent image by using toner charged to a polarity (second polarity) opposite to the charging polarity of the photosensitive drum 1.

The intermediate transfer belt 6 is a rotatable, conductive endless transfer belt. The intermediate transfer belt 6 is stretched across three rollers, including a counter roller 61 serving as a counter member, an auxiliary roller 62, and a tension roller 63, and makes contact with the photosensitive drums 1 to form primary transfer portions. The counter roller 61 is driven to rotate in the direction of the arrow R2 in the diagram (clockwise), whereby the intermediate transfer belt 6 is rotated to move in the direction of the arrow R3 in the diagram (clockwise) at substantially the same circumferential speed as that of the photosensitive drums 1. In the primary transfer portions, a primary transfer power supply unit 50 (first power supply unit) applies a predetermined voltage of positive polarity to the primary transfer brushes 5. The toner images are thereby primarily transferred from the photosensitive drums 1 to the intermediate transfer belt 6 as the photosensitive drums 1 and the intermediate transfer belt 6 rotate. Toner remaining on the photosensitive drums 1 without being transferred to the intermediate transfer belt 6 during primary transfer is cleaned and removed from the photosensitive drums 1 by the cleaning units 7.

The image forming units S sequentially perform the foregoing steps from charging to primary transfer, whereby four color toner images corresponding to an intended color image are formed on the intermediate transfer belt 6. The four color toner images borne on the intermediate transfer belt 6 are then passed through a secondary transfer portion formed by contact of a secondary transfer roller 8 with the intermediate transfer belt 6. During this process, the four color toner images are simultaneously secondarily transferred to the surface of a transfer material P fed from a feed tray 21 by a feeding unit 22. Examples of the transfer material P include a sheet of paper and an overhead projector (OHP) sheet.

The secondary transfer roller 8 serving as a secondary transfer member is driven to rotate by the intermediate transfer belt 6. A power supply unit 90 (second power supply unit) applies a voltage to the secondary transfer roller 8. A current thus flows from the secondary transfer roller 8 to the counter roller 61 via the intermediate transfer belt 6 and the transfer material P, and the four color toner images borne on the intermediate transfer belt 6 is secondarily transferred to the transfer material P. The four color toner images secondarily transferred to the transfer material P are heated and pressed in a fixing unit 9, whereby the four color toner images are melted, blended, and fixed to the transfer material P. The transfer material P is then discharged from the image forming apparatus 100 by a not-illustrated conveyance roller.

Toner remaining on the intermediate transfer belt 6 without being secondarily transferred onto the transfer material P (hereinafter, referred to as residual toner) is charged by a conductive brush 16 serving as a contact member. The conductive brush 16 is arranged downstream of the secondary transfer portion and upstream of the photosensitive drums 1 in the moving direction of the intermediate transfer belt 6. The conductive brush 16 includes brush-like conductive fibers formed by dispersing carbon in nylon. A voltage of positive polarity is applied from the power supply unit 90 to the conductive brush 16. The residual toner passing through a position in which the conductive brush 16 makes contact with the intermediate transfer belt 6 is thereby charged to a positive polarity. Here, part of the residual toner may not be charged to the positive polarity. Such residual toner remaining negative in polarity may be collected by the conductive brush 16 to which the voltage of positive polarity is applied.

The residual toner charged to the positive polarity is reversely transferred from the intermediate transfer belt 6 to the photosensitive drums 1 when passing through the primary transfer portions, and then cleaned by the cleaning units 7. Reversely transferring toner from the intermediate transfer belt 6 to the photosensitive drums 1 will hereinafter be referred to as reverse transfer.

The power supply unit 90 applies a voltage of negative polarity to the conductive brush 16, whereby the residual toner of negative polarity collected by the conductive brush 16 is discharged from the conductive brush 16 to the intermediate transfer belt 6. Subsequently, when passing through the primary transfer portions, the residual toner of negative polarity is reversely transferred to the photosensitive drums 1 by the primary transfer power supply unit 50 applying a voltage of negative polarity to the primary transfer brushes 5 to form an electric field in a direction in which the residual toner is directed from the intermediate transfer belt 6 to the photosensitive drums 1. Like the residual toner of positive polarity, the residual toner of negative polarity reversely transferred to the photosensitive drums 1 is then cleaned by the cleaning units 7.

[Primary Transfer Configuration]

A configuration of primary transfer according to the present exemplary embodiment will be described with reference to FIGS. 2A and 2B.

Figure 2A:
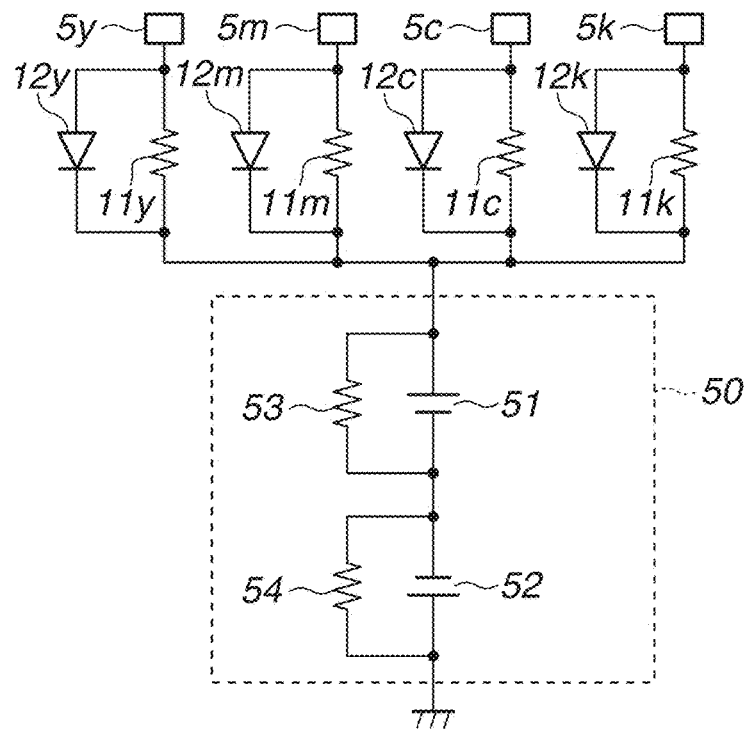
FIG. 2A is a schematic circuit diagram related to primary transfer according to one or more aspects of the present disclosure.

FIG. 2A is a schematic circuit diagram related to the primary transfer according to the present exemplary embodiment. As illustrated in FIG. 2A, in the present exemplary embodiment, the four image forming units S use the primary transfer power supply unit 50 (first power supply unit) in common to apply a voltage to the primary transfer brushes 5y, 5m, 5c, and 5k.

The primary transfer power supply unit 50 includes a high-voltage positive power supply unit 51 which can output a voltage of positive polarity, and a high-voltage negative power supply unit 52 which can output a voltage of negative polarity. The high-voltage positive power supply unit 51 applies a voltage of positive polarity, which is opposite to the normal charging polarity of toner, to the primary transfer brushes 5 when the toner images formed on the photosensitive drums 1 are primarily transferred to the intermediate transfer belt 6 during image formation. The high-voltage negative power supply unit 52 applies a voltage of negative polarity to the primary transfer brushes 5 when the residual toner of negative polarity is reversely transferred from the intermediate transfer belt 6 to the photosensitive drums 1. In the present exemplary embodiment, the primary transfer power supply unit 50 can output a voltage in the range of −2000 V to +4000 V to the primary transfer brushes 5 by using the high-voltage positive and negative power supply units 51 and 52.

A resistance element 53 serving as a bleeder resistor is connected in parallel with the high-voltage positive power supply unit 51. When the high-voltage negative power supply unit 52 applies a voltage of negative polarity to the primary transfer brushes 5, a current flows through the resistance element 53. A resistance element 54 serving as a bleeder resistor is connected in parallel with the high-voltage negative power supply unit 52. When the high-voltage positive power supply unit 51 applies a voltage of positive polarity to the primary transfer brushes 5 during image formation, a current flows through the resistance element 54.

In the present exemplary embodiment, the direction in which a current flows when the primary transfer power supply unit 50 applies a voltage of positive polarity to the primary transfer brushes 5 will be referred to as a first direction. If the primary transfer power supply unit 50 applies a voltage of negative polarity to the primary transfer brushes 5, a current flows in a direction opposite to the first direction. In the present exemplary embodiment, such a direction of the current flow will be referred to as a second direction.

The primary transfer brushes 5y, 5m, 5c, and 5k push up the intermediate transfer belt 6 with pressing force of not-illustrated pressure springs so that an outer peripheral surface of the intermediate transfer belt 6 makes contact with the photosensitive drums 1 at a predetermined contact pressure. Conductive fibers of nylon or polyester in which carbon powder is dispersed are widely used as brush-like fibers of the primary transfer brushes 5. From the viewpoint of transfer efficiency, it is preferable that the fibers have a resistivity $\rho$ in the range of 10 to $10^8 \Omega \cdot cm$. In the present exemplary embodiment, the primary transfer brushes 5 include brush-like fibers made of nylon in which carbon powder is dispersed, with a resistivity ρ of $10^6$ Ω·cm.

Resistance elements 11 having a resistance value sufficiently greater than variations in the electrical resistance of the primary transfer brushes 5 are arranged between the respective primary transfer brushes 5 and the primary transfer power supply unit 50. Such a configuration can pass substantially uniform primary transfer currents through the image forming units S to ensure favorable primary transferability without being affected by variations in the electrical resistance of the primary transfer brushes 5. In the present exemplary embodiment, the resistance elements 11 have a resistance value of 50 MΩ.

Diodes 12 serving as rectification elements are connected in parallel with the respective resistance elements 11. The diodes 12 are arranged between the primary transfer brushes 5 and the primary transfer power supply unit 50 in a direction in which a current flowing in the first direction is blocked when a voltage of positive polarity is applied from the primary transfer power supply unit 50 to the primary transfer brushes 5. In other words, the diodes 12 are connected in parallel with the resistance elements 11 in a direction in which a current can flow through the diodes 12 when a voltage of negative polarity is applied from the primary transfer power supply unit 50 to the primary transfer brushes 5.

Figure 2B:
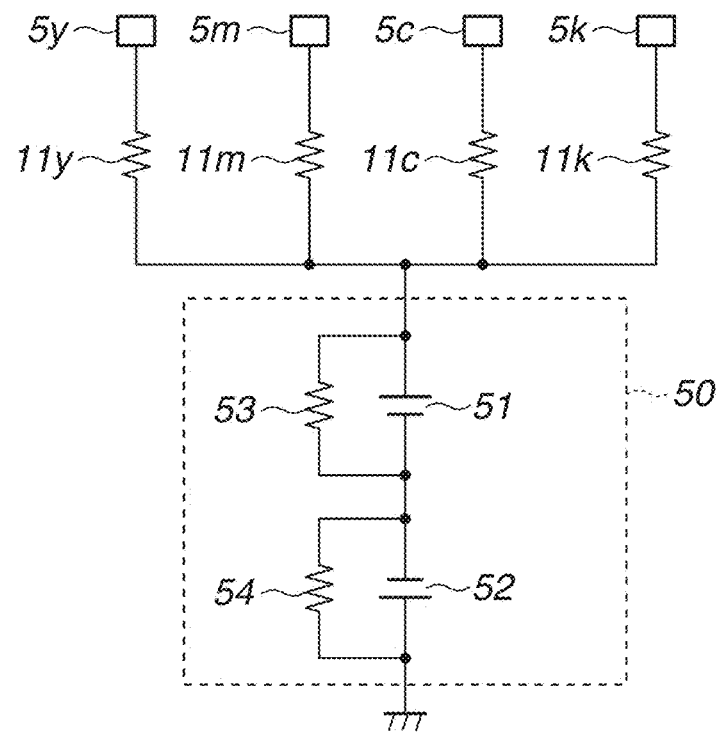
FIG. 2B is a schematic circuit diagram related to primary transfer according to one or more aspects of the present disclosure.

FIG. 2B is a schematic diagram for describing a schematic circuit configuration related to primary transfer in comparative example 1 which is a comparative example of the present exemplary embodiment. As illustrated in FIG. 2B, comparative example 1 is configured not to include the diodes 12 connected in parallel with the resistance elements 11 in the present exemplary embodiment. The configuration of comparative example 1 is similar to that of the present exemplary embodiment except that the diodes 12 are not included. Members having similar configurations will hereinafter be designated by the same reference numerals. A description thereof will be omitted.

[Operation and Effect of Present Exemplary Embodiment]

An operation and effect of the present exemplary embodiment will be described in detail with reference to FIGS. 3, 4A, and 4B.

Figure 3:
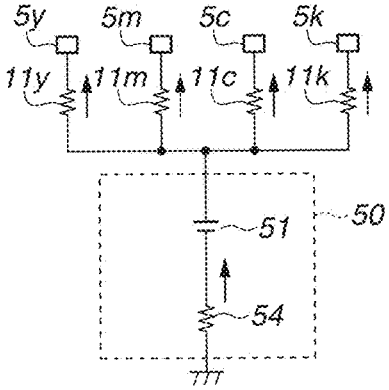
FIG. 3 is a schematic diagram for describing current paths when a voltage of positive or negative polarity is applied according to one or more aspects of the present disclosure.

FIG. 3 is a schematic diagram for describing current paths when the primary transfer power supply unit 50 according to the present exemplary embodiment or comparative example 1 applies a voltage to the primary transfer brush 5. The arrows in FIG. 3 indicate the flowing directions of the currents.

As illustrated in FIG. 3, in the present exemplary embodiment, if the primary transfer power supply unit 50 applies a voltage of positive polarity to the primary transfer brushes 5, the diodes 12 block a current flowing in the first direction. The current flowing in the first direction thus flows via the resistance elements 11. In the present exemplary embodiment, the current paths when the primary transfer power supply unit 50 applies a voltage of positive polarity to the primary transfer brushes 5 are therefore the same as those in comparative example 1.

As illustrated in FIG. 3, if the primary transfer power supply unit 50 applies a voltage of negative polarity, the diodes 12 do not block a current flowing in the second direction. The current flowing in the second direction thus flows via the diodes 12 which have an electrical resistance lower than that of the resistance elements 11. As illustrated in FIG. 3, in comparative example 1, currents flow through the resistance elements 11 to lower the voltages at the primary transfer portions. In the present exemplary embodiment, unlike comparative example 1, the flow of the currents through the diodes 12 can suppress the occurrence of the voltage drop. If the primary transfer power supply units 50 output the same values of voltages of negative polarity, the values of the currents flowing through the primary transfer portions in the present exemplary embodiment are therefore higher than those of the currents flowing through the primary transfer portions in comparative example 1.

FIG. 4 is a table illustrating the values of voltages of negative polarity applied from the primary transfer power supply unit 50 to the primary transfer brushes 5 and the absolute values of the resulting currents flowing through the primary transfer portions in the configurations of the present exemplary embodiment and comparative example 1. The value of a current flowing through a primary transfer portion was determined by the following method. A resistor (not illustrated) having a known resistance value was provided between the primary transfer brush 5 and the resistance element 11. A voltage across the resistor when a voltage of negative polarity is applied from the primary transfer power supply unit 50 was measured. The current flowing through the primary transfer portion was calculated by the equation of Ohm's law (I=V/R). A resistor having a resistance value of 10 kΩ was used as the resistor having a known resistance value.

As illustrated in FIG. 4, in comparative example 1, if the primary transfer power supply unit 50 applies a voltage of −2000 V, a current of 8.0 μA flows through the primary transfer portions in the second direction. In the present exemplary embodiment, a current of 10 μA flows through the primary transfer portions in the second direction. Suppose that a predetermined current is passed through the primary transfer portions to reversely transfer residual toner of negative polarity from the intermediate transfer belt 6 to the photosensitive drums 1. According to the present exemplary embodiment, the predetermined current can be passed through the primary transfer portions by a voltage having an absolute value smaller than in comparative example 1.

For example, suppose that the primary transfer power supply unit 50 needs to apply a voltage of negative polarity to pass a current of 9 μA or higher through the primary transfer portions. With the configuration of comparative example 1, a voltage of negative polarity with an absolute value of greater than −2200 V needs to be applied. With the configuration of the present exemplary embodiment, a voltage of −1800 V can be applied to pass a current of 9 μA through the primary transfer portions.

As described above, according to the configuration of the present exemplary embodiment, toner can be reversely transferred from the intermediate transfer belt 6 to the photosensitive drums 1 at a voltage with a smaller absolute value while image defects due to variations in the values of the currents flowing through the photosensitive drums 1 during image formation are suppressed. In other words, a power supply unit having a lower output value can be employed as the high-voltage negative power supply unit 52 by which the primary transfer power supply unit 50 applies a voltage of negative polarity to the primary transfer brushes 5. This contributes to miniaturization of the high-voltage negative power supply unit 52.

Figure 5:
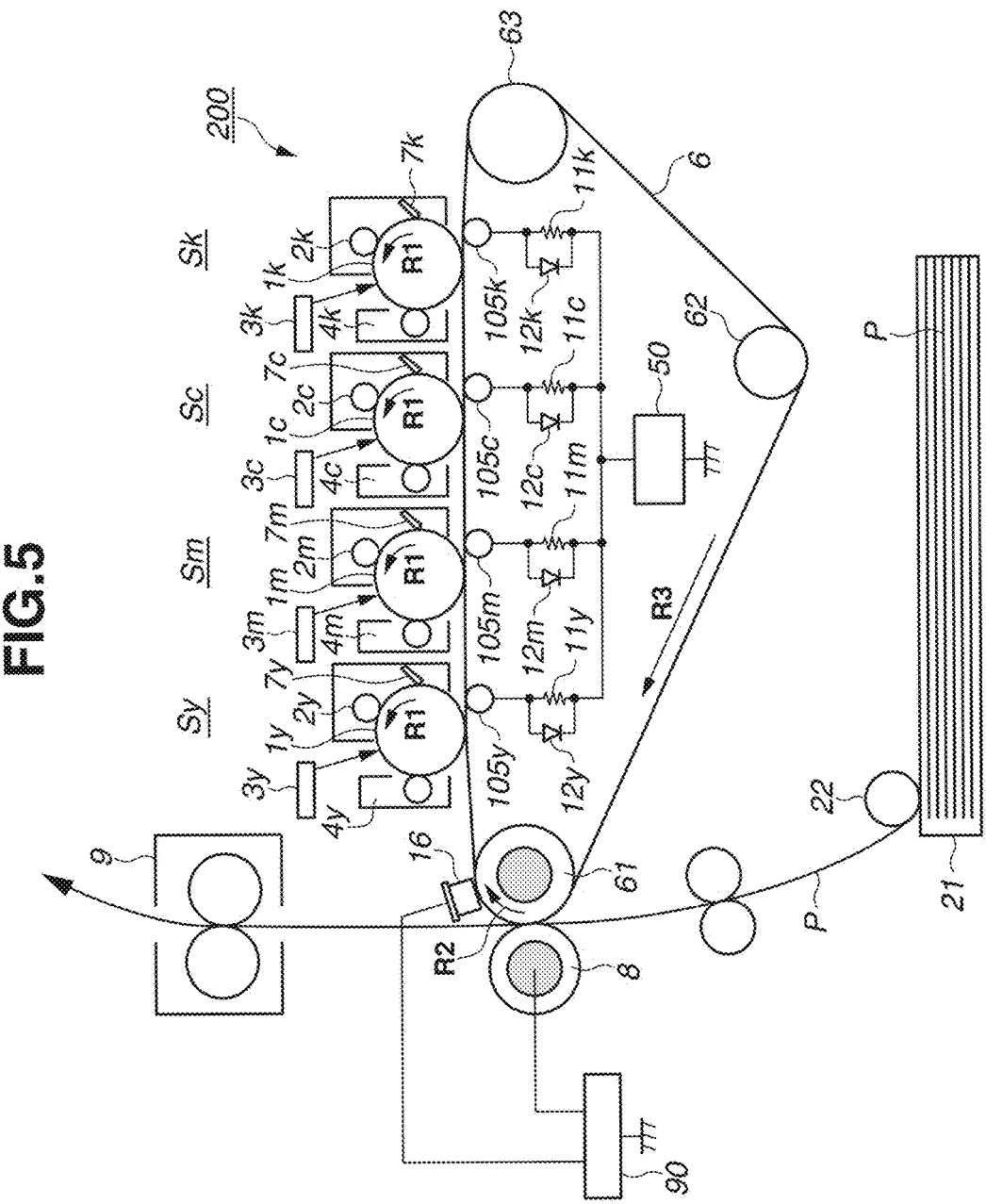
FIG. 5 is a schematic sectional view for describing an image forming apparatus according to one or more aspects of the present disclosure.

In the present exemplary embodiment, the primary transfer brushes 5 are used as the primary transfer members. However, this is not restrictive. Roller members having a conductive elastic layer, conductive sheet members, and metal rollers may be used. FIG. 5 is a schematic sectional view for describing a configuration of an image forming apparatus 200 as a modification of the present exemplary embodiment. As illustrated in FIG. 5, in the modification, metal rollers 105y, 105m, 105c, and 105k are arranged downstream, in the moving direction of the intermediate transfer belt 6, of positions where the respective photosensitive drums 1y, 1m, 1c, and 1k make contact with the intermediate transfer belt 6. With such a configuration in which the metal rollers 105 are arranged with an offset from the respective photosensitive drums 1, the distances between the photosensitive drums 1 and the metal rollers 105 may vary from one image forming unit S to another because of arrangement errors of the metal rollers 105.

The intermediate transfer belt 6 has a predetermined electrical resistance. If the distances between the metal rollers 105 and the photosensitive drums 1 vary from one image forming unit S to another, the electrical resistances between the metal rollers 105 and the photosensitive drum 1 can also vary. As a result, the primary transfer currents flowing through the respective primary transfer portions can also vary. In the modification, like the present exemplary embodiment, the resistance elements 11 can be provided between the primary transfer power supply unit 50 and the metal rollers 105 to suppress variations of the primary transfer currents. Like the present exemplary embodiment, the provision of the diodes 12 can reduce the absolute value of the voltage of negative polarity to be applied from the primary transfer power supply unit 50. The modification can thus provide a similar effect to that of the present exemplary embodiment.

In the present exemplary embodiment, the image forming apparatus 100 is described to be of an intermediate transfer system in which the intermediate transfer belt 6 is used. However, this is not restrictive. An exemplary embodiment of present disclosure may be applied to an image forming apparatus of a direct transfer system which includes a conveyance belt for conveying a transfer material P, in which case a similar effect to that of the present exemplary embodiment can be obtained.

[Ion-Conductive Intermediate Transfer Belt]

In the present exemplary embodiment, the intermediate transfer belt 6 is an endless belt of polyvinylidene difluoride (PVDF) in which an ion conductive agent is mixed to provide ion conductivity. The endless intermediate transfer belt 6 can be obtained by melt-kneading the ion conductive agent and the resin material, and then appropriately selecting a molding method. Examples of the molding method include inflation molding, cylindrical extrusion molding, and injection blow molding. The intermediate transfer belt 6 according to the present exemplary embodiment includes a highly-airtight acrylic coating layer which is formed on the surface layer on the outer peripheral surface side by spray coating.

In the present exemplary embodiment, the intermediate transfer belt 6 is made of PVDF. However, other thermoplastic resin materials may be used. For example, a material such as polyester or an acrylonitrile butadiene styrene copolymer (ABS) or mixed resins thereof may be used. Examples of the ion-conductive conductive agent may include polyvalent metal salts and quaternary ammonium salts. The ion conductive agent includes cations having positive charges and anions having negative charges. Such charges give ion conductivity to the intermediate transfer belt 6.

Figure 6A:
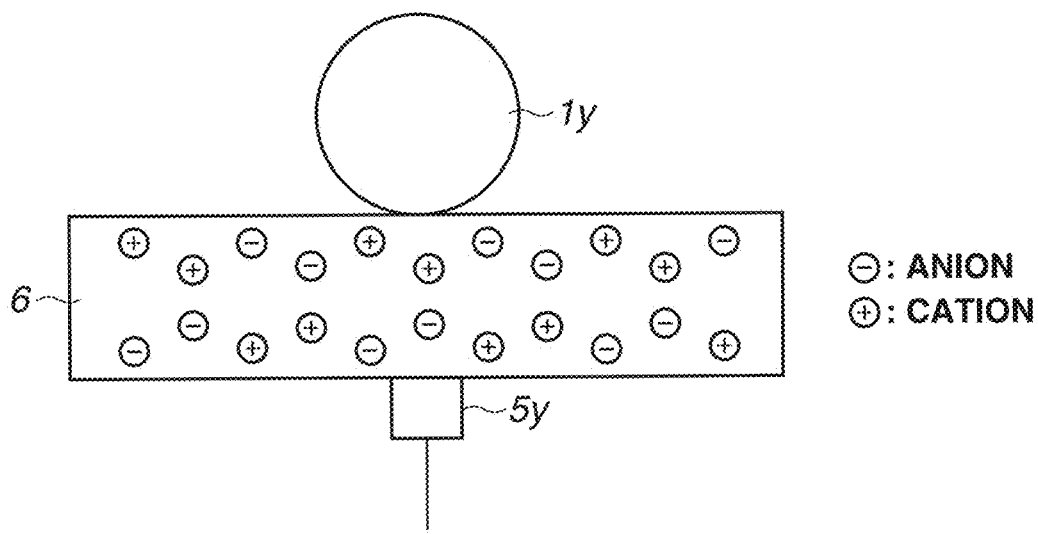
FIG. 6A is a schematic diagram for describing a state of charges in an intermediate transfer belt when no voltage is applied from the primary transfer power supply unit according to one or more aspects of the present disclosure.
Figure 6B:
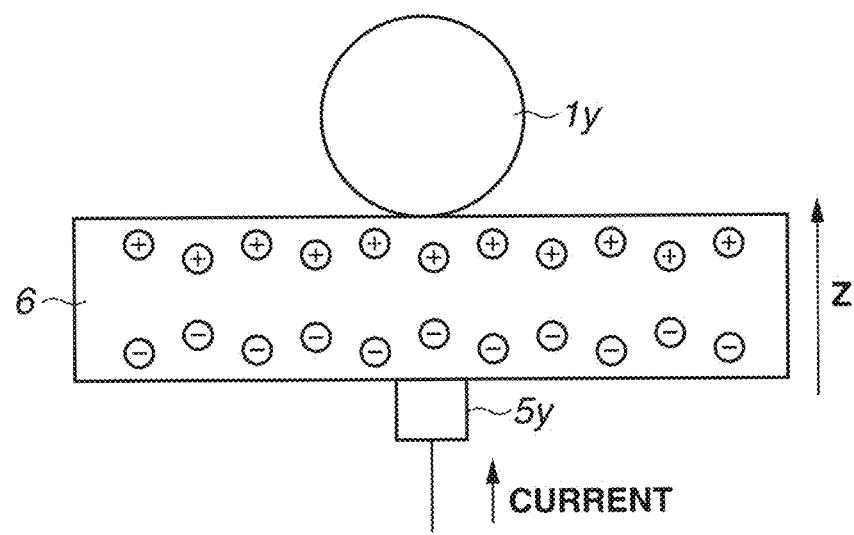
FIG. 6B is schematic diagram for describing the state of charges in the intermediate transfer belt when a voltage of positive polarity is applied from the primary transfer power supply unit according to one or more aspects of the present disclosure.

The intermediate transfer belt 6 using the ion conductive agent as a conductive agent like the present exemplary embodiment can suppress a manufacturing tolerance of the electrical resistance of the intermediate transfer belt 6, compared to ones using electron-conductive conductive agents. However, if the primary transfer power supply unit 50 applies a voltage of positive polarity to pass currents through the first primary portions in the first direction, the ion-conductive intermediate transfer belt 6 may cause a charge migration phenomenon as illustrated in FIGS. 6A and 6B. The charge migration phenomenon of the intermediate transfer belt 6, which can occur in the primary transfer portions of the image forming units S, will be described in detail below with reference to the intermediate transfer belt 6 in the vicinity of the photosensitive drum 1y.

FIG. 6A is a schematic diagram for describing a state of charges in the intermediate transfer belt 6 in the vicinity of the photosensitive drum 1y according to the present exemplary embodiment when no voltage is applied from the primary transfer power supply unit 50 to the primary transfer brush 5y. Here, cations and anions lie in the intermediate transfer belt 6 in a distributed manner.

FIG. 6B is a schematic diagram for describing a state of charges in the intermediate transfer belt 6 in the vicinity of the photosensitive drum 1y according to the present exemplary embodiment when a voltage of positive polarity is applied from the primary transfer power supply unit 50 to the primary transfer brush 5y. The application of the voltage of positive polarity from the primary transfer power supply unit 50 passes a current through the primary transfer portion in the first direction. As illustrated in FIG. 6B, an electric field in the direction of the arrow Z in the diagram is thereby formed in the layer of the intermediate transfer belt 6. Receiving force from the electric field, cations start to move toward the photosensitive drum 1y, and anions toward the primary transfer brush 5y.

In other words, if the primary transfer power supply unit 50 applies a voltage of positive polarity to the primary transfer brushes 5y, 5m, 5c, and 5k, cations in the intermediate transfer belt 6 start to move toward the outer peripheral surface of the intermediate transfer belt 6, and anions toward the inner peripheral surface of the intermediate transfer belt 6. In particular, if image formation is continuously performed, cations and anions in the intermediate transfer belt 6 continue to receive force from the electric field, and charges are likely to be unevenly distributed to the outer and inner peripheral surface sides of the intermediate transfer belt 6.

Cations moved to the outer peripheral surface side of the intermediate transfer belt 6 are blocked by the highly-airtight coating layer provided on the surface layer, and will not be deposited on the outer peripheral surface of the intermediate transfer belt 6. Meanwhile, there is no coating layer on the surface layer on the inner peripheral surface side of the intermediate transfer belt 6 where the primary transfer brushes 5 make contact. Anions moved to the inner peripheral surface side of the intermediate transfer belt 6 may thus be deposited on the inner peripheral surface of the intermediate transfer belt 6. The deposition of anions contributing to ion conductivity can lower the conductivity of the intermediate transfer belt 6.

If the anions deposited on the intermediate transfer belt 6 adhere to a primary transfer brush 5, the resistance of the primary transfer portion increases. A current flowing through the primary transfer portion may thus become insufficient, and a transfer defect can occur. In the present exemplary embodiment, the primary transfer power supply unit 50 then applies a voltage of negative polarity to the primary transfer brushes 5 after image formation, so that an electric field in a direction opposite to that during image formation is formed in the primary transfer portions to prevent an uneven distribution of charges in the intermediate transfer belt 6.

When the primary transfer power supply unit 50 applies a voltage of negative polarity to prevent an uneven distribution of charges in the intermediate transfer belt 6, like during the cleaning of residual toner of negative polarity, variations of the currents flowing through the primary transfer portions do not need to be strictly managed. In other words, like during the cleaning of residual toner of negative polarity, a voltage having a smaller absolute value can be desirably applied to suppress an uneven distribution of charges in the intermediate transfer belt 6.

According to the configuration of the present exemplary embodiment, when the primary transfer power supply unit 50 applies a voltage of negative polarity to the primary transfer brushes 5, an uneven distribution of charges in the ion-conductive intermediate transfer belt 6 can thus be suppressed by a voltage having a smaller absolute value.

Figure 7:
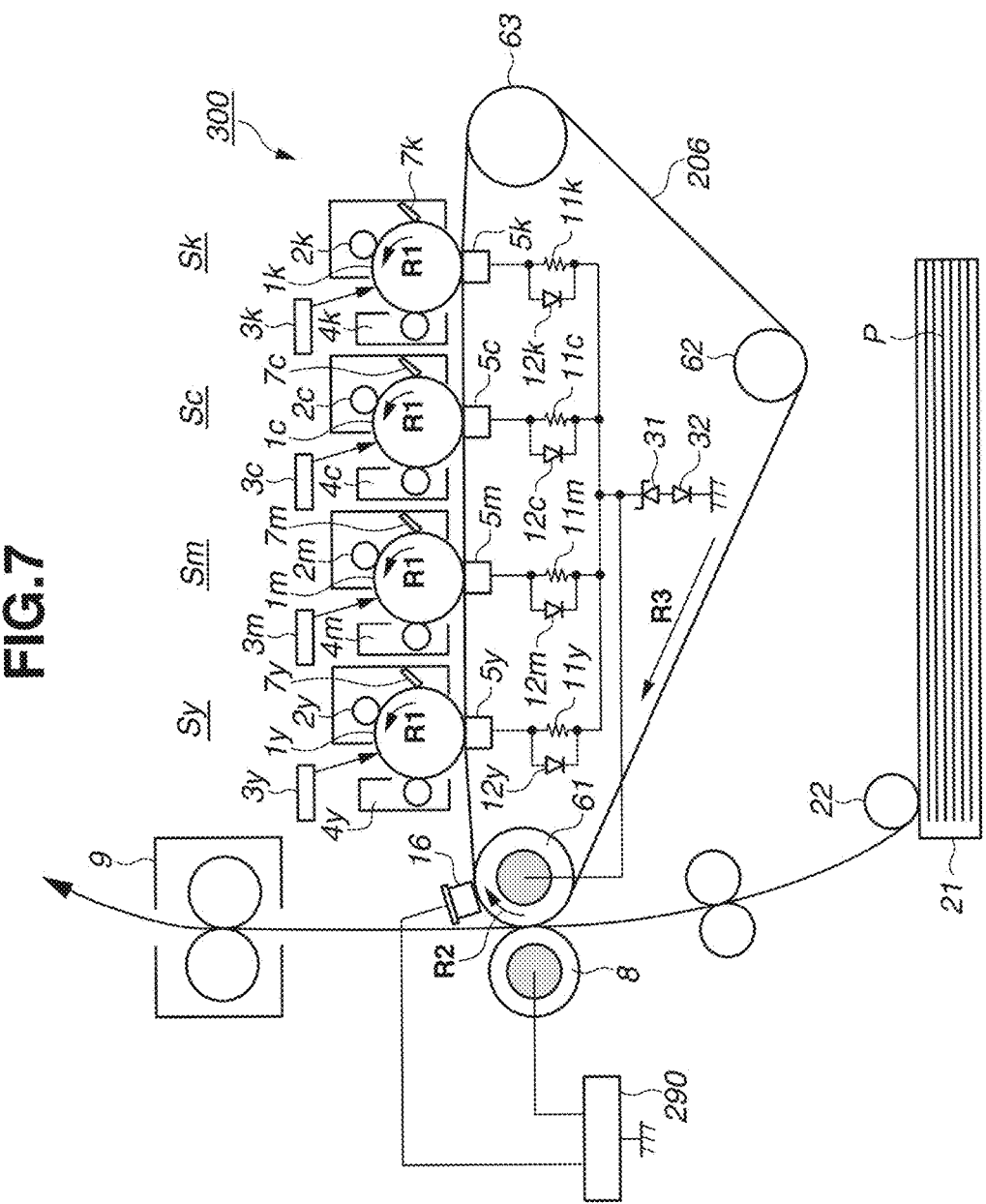
FIG. 7 is a schematic sectional view for describing an image forming apparatus according to one or more aspects of the present disclosure.

In the first exemplary embodiment, the common primary transfer power supply unit 50 is described to apply a voltage to the primary transfer brushes 5 of the image forming units S for primary transfer. As illustrated in FIG. 7, a second exemplary embodiment includes a configuration in which four image forming units S use a common primary transfer power supply unit, and the primary transfer power supply unit is integrated with a secondary transfer power supply unit. The configuration of the second exemplary embodiment uses a conductive intermediate transfer belt 206. Both primary transfer and secondary transfer are performed by a power supply unit 290 applying a voltage to a secondary transfer roller 8 serving as a secondary transfer member. An image forming apparatus 300 according to the present exemplary embodiment is similar to the image forming apparatus 100 according to the first exemplary embodiment except that the power supply unit 290 applies a voltage to the secondary transfer roller 8 for primary transfer. Members similar to those of the first exemplary embodiment will thus be designated by the same reference numerals. A description thereof will be omitted.

FIG. 7 is a schematic sectional view for describing a configuration of the image forming apparatus 300 according to the present exemplary embodiment. As illustrated in FIG. 7, the power supply unit 290 is connected to the secondary transfer roller 8. The secondary transfer roller 8 is electrically grounded via the intermediate transfer belt 206, the counter roller 61 serving as a counter member, a Zener diode 31, and a diode 32. The primary transfer brushes 5*y*, 5*m*, 5*c*, and 5*k* serving as primary transfer members are electrically connected to the counter roller 61, and electrically grounded via the Zener diode 31 and the diode 32. To distinguish the diodes 12 connected to the resistance elements 11 in the primary transfer portions of the present exemplary embodiment from the diode 32, the diodes 12 may be referred to as first diodes. The diode 32 may be referred to as a second diode.

The Zener diode 31 serving as a constant voltage element is an element that maintains a predetermined voltage (hereinafter, referred to as a breakdown voltage) when a current flows therethrough. The breakdown voltage occurs on the cathode side when a certain or higher current flows. In the present exemplary embodiment, the cathode side of the Zener diode 31 is connected to the counter roller 61 and the primary transfer brushes 5. The anode side of the Zener diode 31 is connected to the anode side of the diode 32. The cathode side of the diode 32 is electrically grounded.

[Primary Transfer Configuration]

Figure 8A:
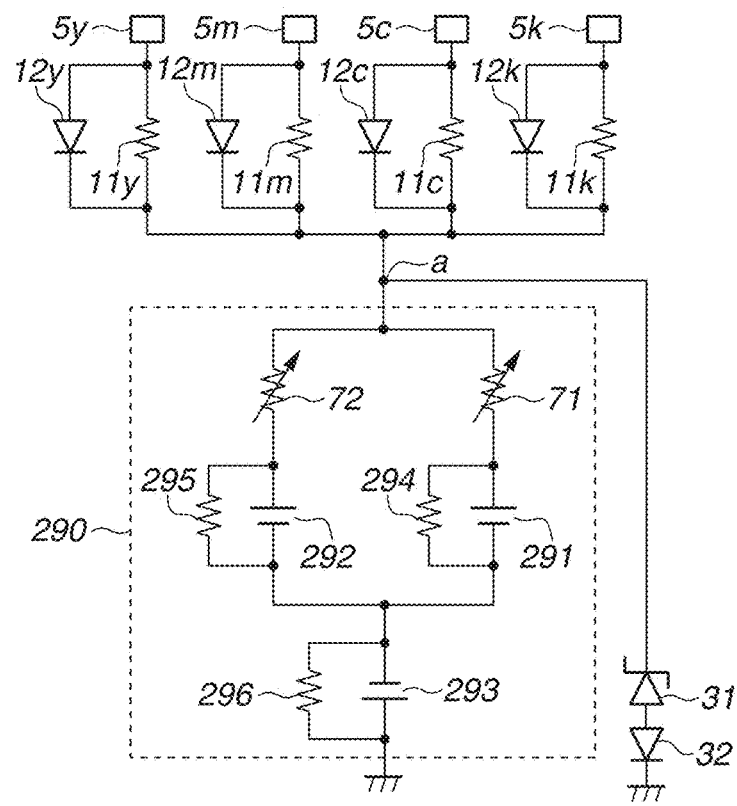
FIG. 8A is a schematic circuit diagram related to primary transfer according to one or more aspects of the present disclosure.
Figure 8B:
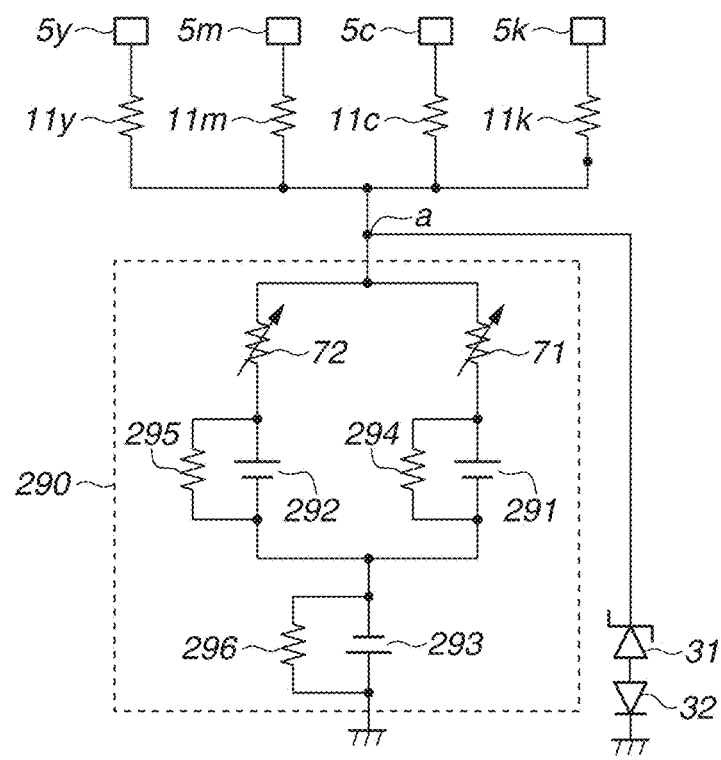
FIG. 8B is a schematic circuit diagram related to primary transfer according to one or more aspects of the present disclosure.

A configuration of primary transfer according to the present exemplary embodiment will be described with reference to FIGS. 8A and 8B. FIG. 8A is a schematic circuit diagram related to the primary transfer according to the present exemplary embodiment. FIG. 8B is a schematic circuit diagram related to primary transfer according to comparative example 2 which is a comparative example of the present exemplary embodiment. As illustrated in FIG. 8B, the configuration of comparative example 2 is similar to that of the present exemplary embodiment except that the diodes 12 connected in parallel with the resistance elements 11 in the present exemplary embodiment are not included. Members having similar configurations will hereinafter be designated by the same reference numerals. A description thereof will be omitted.

A combined resistance 72 is a combined resistance of the secondary transfer roller 8 and the intermediate transfer belt 206 in the secondary transfer portion. A combined resistance 71 is a combined resistance of the conductive brush 16 and the intermediate transfer belt 206 in the position where the conductive brush 16 makes contact with the intermediate transfer belt 206. Both the electrical resistances vary depending on the environment in which the image forming apparatus 300 is installed. In FIGS. 8A and 8B, the combined resistances 71 and 72 are therefore represented as variable resistances.

The power supply unit 290 includes a high-voltage positive power supply unit 292 and a high-voltage positive power supply unit 291 which can output a voltage of positive polarity, and a high-voltage negative power supply unit 293 which can output a voltage of negative polarity. The high-voltage positive power supply unit 292 is connected to the secondary transfer roller 8. The high-voltage positive power supply unit 291 is connected to the conductive brush 16. The high-voltage negative power supply unit 293 is connected to both the secondary transfer roller 8 and the conductive brush 16. A resistance element 295 serving as a bleeder resistor is connected in parallel with the high-voltage positive power supply unit 292. A resistance element 294 serving as a bleeder resistor is connected in parallel with the high-voltage positive power supply unit 291. A resistance element 296 serving as a bleeder resistor is connected in parallel with the high-voltage negative power supply unit 293.

In the configuration of the present exemplary embodiment, if the power supply unit 290 applies a voltage of positive polarity to the secondary transfer roller 8, a current flows from the secondary transfer roller 8 to the Zener diode 31 via the conductive intermediate transfer belt 206 and the counter roller 61. If a current greater than or equal to a predetermined value flows through the Zener diode 31, the cathode side of the Zener diode 31 is maintained at the predetermined voltage (breakdown voltage). In FIGS. 8A and 8B, a point a is thereby maintained at the breakdown voltage of the Zener diode 31. As a result, primary transfer currents flow through the primary transfer brushes 5, whereby toner images are primarily transferred from the photosensitive drums 1 to the intermediate transfer belt 206.

If the power supply unit 290 applies a voltage of negative polarity to the secondary transfer roller 8 and the conductive brush 16, the Zener diode 31 is forward biased. No current thus flows through the Zener diode 31. The diode 32 passes a current from the anode to the cathode, and blocks a current from the cathode to the anode. If a voltage of negative polarity is applied from the power supply unit 290, no current therefore flows through the diode 32, either. In such a case, the sum of the values of the currents flowing through the secondary transfer roller 8 and the conductive brush 16 coincides with the sum of the values of the currents flowing through the primary transfer brushes 5*y*, 5*m*, 5*c*, and 5*k*.

In the present exemplary embodiment, the power supply unit 290 can output a voltage in the range of −2000 V to +4000 V to the secondary transfer roller 8 by using the high-voltage positive and negative power supply units 292 and 293.

Figure 9:
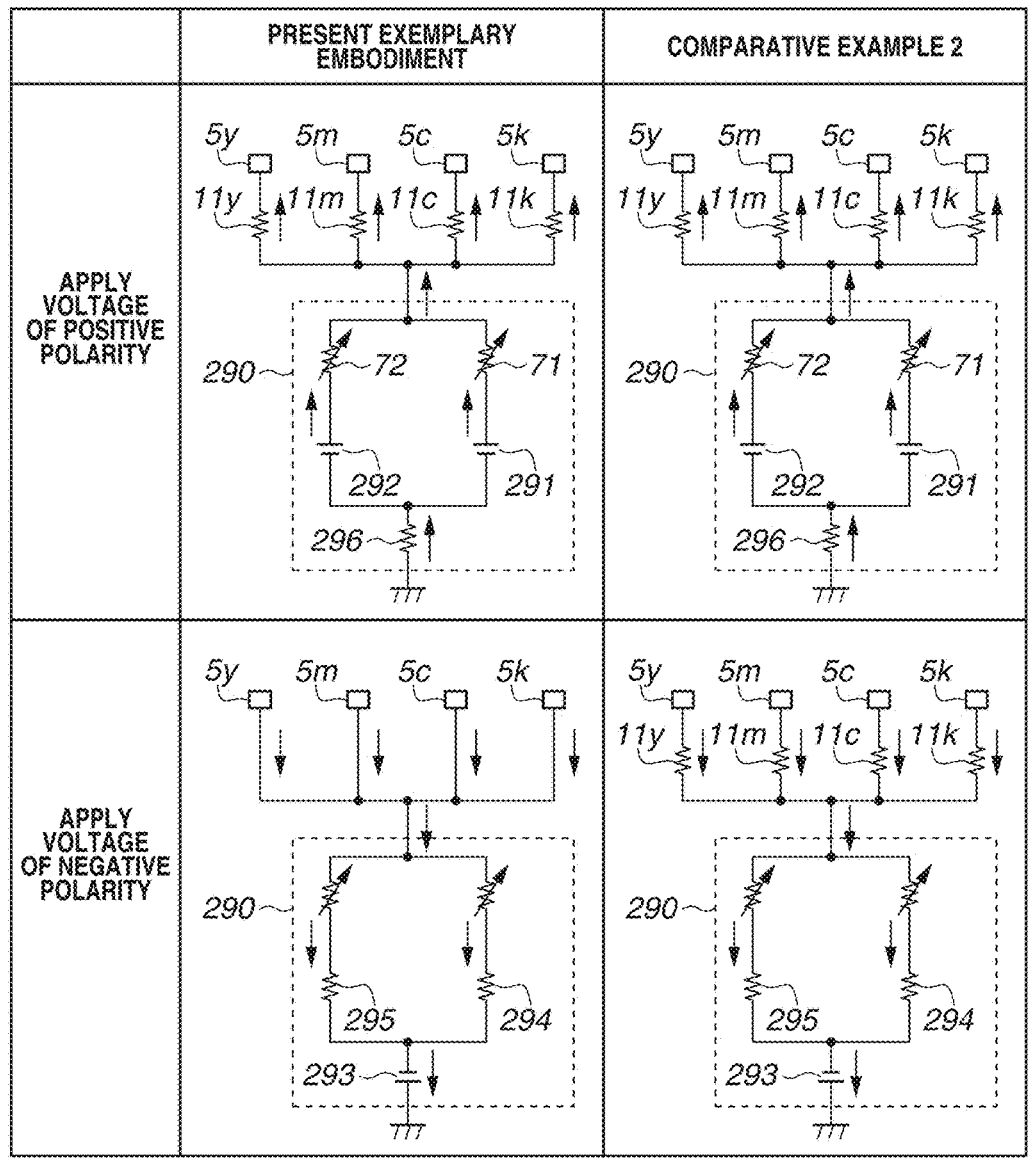
FIG. 9 is a schematic diagram for describing current paths when a voltage of positive or negative polarity is applied according to one or more aspects of the present disclosure.

FIG. 9 is a schematic diagram for describing current paths when the power supply unit 290 according to the present exemplary embodiment or comparative example 2 applies a voltage to the primary transfer brushes 5. The arrows in FIG. 9 indicate directions in which the currents flow.

As illustrated in FIG. 9, even with the configuration of the present exemplary embodiment, if the power supply unit 290 applies a voltage of positive polarity to the secondary transfer roller 8, toner images can be primarily transferred from the photosensitive drums 1 to the intermediate transfer belt 206 like the first exemplary embodiment. As illustrated in FIG. 9, in the configuration of the present exemplary embodiment, if the power supply unit 290 applies a voltage of negative polarity to the secondary transfer roller 8, currents can be passed through the primary transfer portions in the second direction like the first exemplary embodiment.

In the configuration of the present exemplary embodiment, like the first exemplary embodiment, the diodes 12 are connected in parallel with the resistance elements 11 in a direction in which the currents flowing in the first direction are blocked. As illustrated in FIG. 9, if the power supply unit 290 applies a voltage to the primary transfer brushes 5, the currents flowing in the first direction flow via the resistance elements 11, and the currents flowing in the second direction flow via the diodes 12.

FIG. 10 is a table illustrating the values of voltages of negative polarity applied from the power supply unit 290 to the primary transfer brushes 5 and the absolute values of the resulting currents flowing through the primary transfer portions in the configuration of the present exemplary embodiment and comparative example 2. The value of a current flowing through a primary transfer portion was determined by using the same method as in the first exemplary embodiment. As illustrated in FIG. 10, in the present exemplary embodiment, if the power supply unit 290 applies a voltage of negative polarity to pass a current through the primary transfer portions in the second direction, a predetermined current can be passed through the primary transfer portions by a voltage having an absolute value smaller than in comparative example 2. In other words, in the present exemplary embodiment, the primary transfer power supply unit and the secondary transfer power supply unit are integrated, and both primary transfer and secondary transfer are performed by the power supply unit 290 applying a voltage to the secondary transfer roller 8. Such a configuration can also provide a similar effect to that of the first exemplary embodiment.

In the present exemplary embodiment, high-voltage power supply units that can apply a voltage of negative polarity to the conductive brush 16 and the secondary transfer roller 8 are made common. If the power supply unit 290 applies a voltage of negative polarity, the voltage of negative polarity is applied to various members from the one high-voltage negative power supply unit 293. In the present exemplary embodiment, the absolute value of the voltage of negative polarity output from the high-voltage negative power supply unit 293 can be reduced. A high-voltage negative power supply unit 293 of smaller size can thus be selected.

In the present exemplary embodiment, the primary transfer brushes 5 are used as the primary transfer members. However, this is not restrictive. Roller members having a conductive elastic layer, conductive sheet members, and metal rollers may be used. Like the modification of the first exemplary embodiment, a plurality of metal rollers serving as the primary transfer members may be arranged with an offset from the respective photosensitive drums 1. Such a configuration can also provide a similar effect to that of the present exemplary embodiment.

While the present disclosure has been described with reference to exemplary embodiments, the scope of the following claims is to be accorded the broadest interpretation so as to encompass all such modifications and equivalent structures and functions.

This application claims the benefit of Japanese Patent Application No. 2016-150419, filed Jul. 29, 2016, which is hereby incorporated by reference herein in its entirety.

What is claimed is:

1. An image forming apparatus comprising:
   an image bearing member configured to bear a toner image;
   a transfer belt configured to rotate in contact with the image bearing member;
   a transfer member configured to make contact with an inner peripheral surface of the transfer belt, wherein the transfer member is provided to correspond to the image bearing member;
   a first power supply unit configured to apply a voltage to the transfer member, wherein if the first power supply unit applies a voltage of a second polarity opposite to a first polarity to the transfer member, a current flows in a first direction through a position in which the image bearing member makes contact with the transfer belt, and if the first power supply unit applies a voltage of the first polarity to the transfer member, a current flows in a second direction opposite to the first direction through the position in which the image bearing member makes contact with the transfer belt, the first polarity being a normal charging polarity of toner;
   a resistance element connected between the first power supply unit and the transfer member; and
   a diode connected in parallel with the resistance element in a direction in which the current flowing in the first direction is blocked and the current flowing in the second direction is passed.

2. The image forming apparatus according to claim 1, wherein the current flowing in the first direction flows via the resistance element.

3. The image forming apparatus according to claim 1, further comprising:
   a plurality of image bearing members; and
   a plurality of transfer members provided to correspond to the plurality of image bearing members,
   wherein the resistance element has a resistance value greater than variations in electrical resistance of the plurality of transfer members.

4. The image forming apparatus according to claim 1, wherein the transfer member is brush-like conductive fibers.

5. The image forming apparatus according to claim 1,
   wherein the transfer member is a metal roller, and
   wherein the metal roller is arranged downstream, in a moving direction of the transfer belt, of the position in which the image bearing member makes contact with the transfer belt.

6. The image forming apparatus according to claim 1, further comprising:
   a secondary transfer member configured to make contact with an outer peripheral surface of the transfer belt to form a secondary transfer portion;

a contact member configured to make contact with the transfer belt downstream of the secondary transfer portion and upstream of the image bearing member in a moving direction of the transfer belt; and a second power supply unit configured to apply a voltage to the secondary transfer member and the contact member, wherein toner remaining on the transfer belt after a toner image is transferred from the transfer belt to a transfer material in the secondary transfer portion is charged while passing through a position in which the contact member and the transfer belt make contact, the contact member being subjected to application of a voltage of the second polarity from the second power supply unit, and moves from the transfer belt to the image bearing member in the position in which the image bearing member makes contact with the transfer belt.

7. The image forming apparatus according to claim 6, wherein the contact member is brush-like conductive fibers.

8. The image forming apparatus according to claim 7, wherein if the second power supply unit applies a voltage of the first polarity to the contact member, toner adhering to the contact member when the voltage of the second polarity is applied to the contact member moves from the contact member to the transfer belt, and wherein if the first power supply unit applies the voltage of the first polarity to the transfer member, the toner moved from the contact member to the transfer belt moves from the transfer belt to the image bearing member in the position in which the image bearing member makes contact with the transfer belt.

9. The image forming apparatus according to claim 1, wherein the transfer belt has ion conductivity.

10. An image forming apparatus comprising:

an image bearing member configured to bear a toner image;

an intermediate transfer belt configured to rotate in contact with the image bearing member, wherein a toner image is primarily transferred from the image bearing member to the intermediate transfer belt in a primary transfer portion in which the image bearing member makes contact with the intermediate transfer belt;

a primary transfer member configured to make contact with an inner peripheral surface of the intermediate transfer belt, wherein the primary transfer member is provided to correspond to the image bearing member;

a secondary transfer member configured to make contact with an outer peripheral surface of the intermediate transfer belt to form a secondary transfer portion, and secondarily transfer the toner image from the intermediate transfer belt to a transfer material;

a counter member opposed to the secondary transfer member via the intermediate transfer belt, wherein the counter member and the primary transfer member are electrically connected;

a power supply unit configured to apply a voltage to the secondary transfer member, wherein if the power supply unit applies a voltage of a second polarity opposite to a first polarity to the secondary transfer member, a current flows through a primary transfer portion via the counter member and the primary transfer member in a first direction, and if the power supply unit applies a voltage of the first polarity to the secondary transfer member, a current flows through the primary transfer portion via the counter member and the primary transfer member in a second direction opposite to the first direction, the first polarity being a normal charging polarity of toner;

a resistance element connected between the power supply unit and the primary transfer member; and a first diode connected in parallel with the resistance element in a direction in which the current flowing in the first direction is blocked and the current flowing in the second direction is passed.

11. The image forming apparatus according to claim 10, further comprising:

a constant voltage element connected to the counter member and configured to be maintained at a predetermined voltage when a current flows therethrough; and a second diode configured to be capable of passing a current from its anode to cathode, wherein a cathode side of the constant voltage element is connected to the counter member and the primary transfer member, an anode side of the constant voltage element is connected to an anode side of the second diode, and a cathode side of the second diode is electrically grounded; and wherein if the power supply unit applies the voltage of the second polarity to the secondary transfer member, a current flows through the constant voltage element via the counter member.

12. The image forming apparatus according to claim 10, wherein the toner image is, by the current flowing in the first direction, primarily transferred from the image bearing member to the intermediate transfer belt in the primary transfer portion and secondarily transferred from the intermediate transfer belt to a transfer belt in a secondary transfer portion.

13. The image forming apparatus according to claim 10, wherein the current flowing in the first direction flows via the resistance element.

14. The image forming apparatus according to claim 10, further comprising:

a plurality of image bearing members; and a plurality of primary transfer members provided to correspond to the plurality of image bearing members, wherein the resistance element has a resistance value greater than variations in electrical resistance of the plurality of primary transfer members.

15. The image forming apparatus according to claim 10, wherein the primary transfer member is brush-like conductive fibers.

16. The image forming apparatus according to claim 10, wherein the primary transfer member is a metal roller, and wherein the metal roller is arranged downstream of the primary transfer portion in a moving direction of the intermediate transfer belt.

17. The image forming apparatus according to claim 10, further comprising a contact member configured to make contact with the intermediate transfer belt downstream of the secondary transfer portion and upstream of the image bearing member in a moving direction of the intermediate transfer belt, wherein a voltage is applied to the contact member from the power supply unit, and wherein toner remaining on the intermediate transfer belt after the toner image is secondarily transferred from the intermediate transfer belt to the transfer material in the secondary transfer portion is charged while passing through a position in which the contact member and the intermediate transfer belt make contact, the contact member being subjected to application of a voltage of the second polarity from the power supply unit, and moves from the intermediate transfer belt to the image bearing member in the primary transfer portion.

18. The image forming apparatus according to claim 17, wherein the contact member is brush-like conductive fibers.

19. The image forming apparatus according to claim 18, wherein if the power supply unit applies the voltage of the first polarity to the contact member, toner adhering to the contact member when the voltage of the second polarity is applied to the contact member moves from the contact member to the intermediate transfer belt, and wherein if the power supply unit applies the voltage of the first polarity to the secondary transfer member, the toner moved from the contact member to the intermediate transfer belt moves from the intermediate transfer belt to the image bearing member in the primary transfer portion.

20. The image forming apparatus according to claim 10, wherein the intermediate transfer belt has ion conductivity.

21. The image forming apparatus according to claim 1, wherein in a state in which the first power supply unit applies a voltage of the second polarity to the transfer member, the toner image is transferred from the image bearing member to the transfer belt by the current flowing in the first direction through the position in which the image bearing member makes contact with the transfer belt.

* * * * *